US012753825B2

(12) United States Patent
Kobayashi et al.

(10) Patent No.: US 12,753,825 B2
(45) Date of Patent: Oct. 6, 2026

(54) SPINDLE TURNING DEVICE

(71) Applicant: OKUMA CORPORATION, Niwa-Gun (JP)

(72) Inventors: Ryosuke Kobayashi, Niwa-Gun (JP); Ayumi Akimoto, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 19/171,442

(22) Filed: Apr. 7, 2025

(65) Prior Publication Data

US 2025/0320907 A1 Oct. 16, 2025

(30) Foreign Application Priority Data

Apr. 10, 2024 (JP) ................................ 2024-063593

(51) Int. Cl.
*F16H 1/20* (2006.01)
*B23Q 5/12* (2006.01)

(52) U.S. Cl.
CPC ............... *F16H 1/203* (2013.01); *B23Q 5/12* (2013.01)

(58) Field of Classification Search
CPC . F16H 1/203; F16H 1/166; F16H 1/16; B23Q 5/12; B23Q 1/706; B23Q 1/52; B23Q 1/54
See application file for complete search history.

(56) References Cited

U.S. PATENT DOCUMENTS 3,828,649 A * 8/1974 Lecailtel .................. B23Q 1/54 409/230
2014/0300065 A1* 10/2014 Jung ........................ B23Q 1/26 279/142
2020/0254541 A1* 8/2020 Bouraoui .................. B23C 1/12

FOREIGN PATENT DOCUMENTS

DE 102020102272 A1 * 8/2020 ......... F16H 57/0417
JP 2015-502862 A 1/2015

OTHER PUBLICATIONS

DE 102020102272 (Year: 2020).*

* cited by examiner

*Primary Examiner* — Terence Boes
(74) *Attorney, Agent, or Firm* — Muncy, Geissler, Olds & Lowe, P.C.

(57) ABSTRACT

A spindle turning device includes a turning portion and a main body portion. The turning portion includes a rotatable main spindle. The main body portion supports the turning portion turnably around a pivot shaft inclined with respect to an axis line of the main spindle. The main body portion includes a motor that turnably drives the turning portion and a reducer. In a turning position of the turning portion where the axis line of the main spindle faces downward in a vertical direction, a lowermost surface of the main body portion is located above a lowermost surface of the turning portion. The motor is arranged in the main body portion below an axis line of the pivot shaft.

4 Claims, 5 Drawing Sheets

SPINDLE TURNING DEVICE

CROSS REFERENCE TO RELATED APPLICATION

This application claims the benefit of Japanese Patent Application Number 2024-063593 filed on Apr. 10, 2024, the entirety of which is incorporated by reference.

FIELD OF THE INVENTION

The disclosure relates to a spindle turning device disposed in a machine tool to turn a main spindle around a predetermined pivot shaft and, in particular, to a spindle turning device in which a pivot shaft is inclined with respect to an axis line of a main spindle.

BACKGROUND OF THE INVENTION

For example, in a machine tool such as a double column machining center, there has been known a spindle turning device for turning a main spindle, in which a pivot shaft is inclined with respect to an axis line of the main spindle, as disclosed in JP 2015-502862 A.

Since the spindle turning device may be used as a replaceable attachment, a compact design is required to avoid interference with a workpiece and another constituting component when turning in the apparatus and to secure space when replacing the attachment. In particular, as a result of increasing turning space, it leads to a reduction in a machining area and a restricted operating range. Using a tool with a long protrusion to avoid interference leads to extended cutting time and shortened tool life.

While a rotational transmission mechanism, such as a worm gear and roller gear cam, is used in addition to a motor to drive a spindle turning device, the arrangement of these constituting components is also important to achieve downsizing. In the spindle turning device of JP 2015-502862 T, the motor that drives the pivot shaft is arranged on an upper side with respect to the pivot shaft. Accordingly, the position of the pivot shaft must be lowered downward to secure space to arrange the motor. Therefore, the downsizing of the entire unit is hindered.

An objective of the disclosure of the disclosure to provide a spindle turning device that can avoid as much as possible a reduction in a machining area and a restriction of an operating range by compactly arranging a constituting component in a main body portion.

SUMMARY OF THE INVENTION

In order to achieve the above-described objective, the disclosure provides a spindle turning device including a turning portion and a main body portion. The turning portion includes a rotatable main spindle. The main body portion supports the turning portion turnably around a pivot shaft inclined with respect to an axis line of the main spindle. The main body portion includes a motor that turnably drives the turning portion and a reducer. In a turning position of the turning portion where the axis line of the main spindle faces downward in a vertical direction, a lowermost surface of the main body portion is located above a lowermost surface of the turning portion. The motor is arranged in the main body portion below an axis line of the pivot shaft.

In another aspect of the disclosure, which is in the above-described configuration, the reducer includes an input shaft to which a rotation of the motor is transmitted and an output shaft that is coaxially arranged with the axis line of the pivot shaft and transmits a rotation of the input shaft to the pivot shaft, the input shaft is perpendicular to the output shaft, and the motor is arranged in the main body portion in a posture where a motor shaft is parallel to the input shaft.

In another aspect of the disclosure, which is in the above-described configuration, an outer surface in the main body portion on an opposite side from a support side of the turning portion is formed in the vertical direction.

In another aspect of the disclosure, which is in the above-described configuration, in the main body portion, a cable guide portion that guides wiring and/or piping disposed in the turning portion is arranged on an extension of the axis line of the pivot shaft and on a plane perpendicular to the axis line of the pivot shaft. The cable guide portion includes a cable guide into which the wiring and/or piping having flexibility are inserted and a guide housing portion that houses the cable guide, and the guide housing portion is arranged at a position where a center in an up-down direction of the guide housing portion is shifted upward with respect to the axis line of the pivot shaft when viewed in an axis line direction of the pivot shaft.

In another aspect of the disclosure, which is in the above-described configuration, further includes a coupling portion that couples the main body portion rotatably around a second pivot shaft in the vertical direction on an upper side of the main body portion.

In the disclosure, the lowermost surface of the main body portion is located above the lowermost surface of the turning portion, and the motor is arranged in the main body portion on the lower side with respect to the axis line of the pivot shaft. Accordingly, with the disclosure, a reduction in a machining area and a restriction of an operating range can be avoided as much as possible by compactly arranging constituting components in the main body portion.

In another aspect of the disclosure, in the reducer, the input shaft is perpendicular to the output shaft, and the motor is arranged in the main body portion in the posture where the motor shaft is parallel to the input shaft of the reducer. Accordingly, with the aspect, in addition to the above-described effect, the motor and the reducer can be arranged compactly in the main body portion even when the motor and the reducer are asymmetrical.

In another aspect of the disclosure, the outer surface in the main body portion on the opposite side from the support side of the turning portion is formed in the vertical direction. Accordingly, with the aspect, in addition to the above-described effects, the constituting components of the main body portion can also become compact in a horizontal direction, contributing to avoiding the reduction in the machining area and the restriction of the operating range.

In another aspect of the disclosure, the guide housing portion of the cable guide portion is arranged at a position where the center in the up-down direction is shifted upward with respect to the axis line of the pivot shaft when viewed in the axis line direction of the pivot shaft. Accordingly, with the aspect, in addition to the above-described effects, the guide housing portion can be arranged at an upper position to secure the housing space for the motor, raising the position of the motor.

In another aspect of the disclosure, the coupling portion that couples the main body portion rotatably around the second pivot shaft in the vertical direction is further included on the upper side of the main body portion. Accordingly, with the aspect, in addition to the above-described effects, the entire unit can be rotated, and the machining area can be expanded.

BRIEF DESCRIPTION OF THE DRAWINGS

FIG. 5A illustrates a machining state of a workpiece without a tier portion. FIG. 5B illustrates a machining state of a workpiece with a tier portion.

DETAILED DESCRIPTION OF THE INVENTION

The following describes embodiments of the disclosure based on the drawings.

Figure 1:
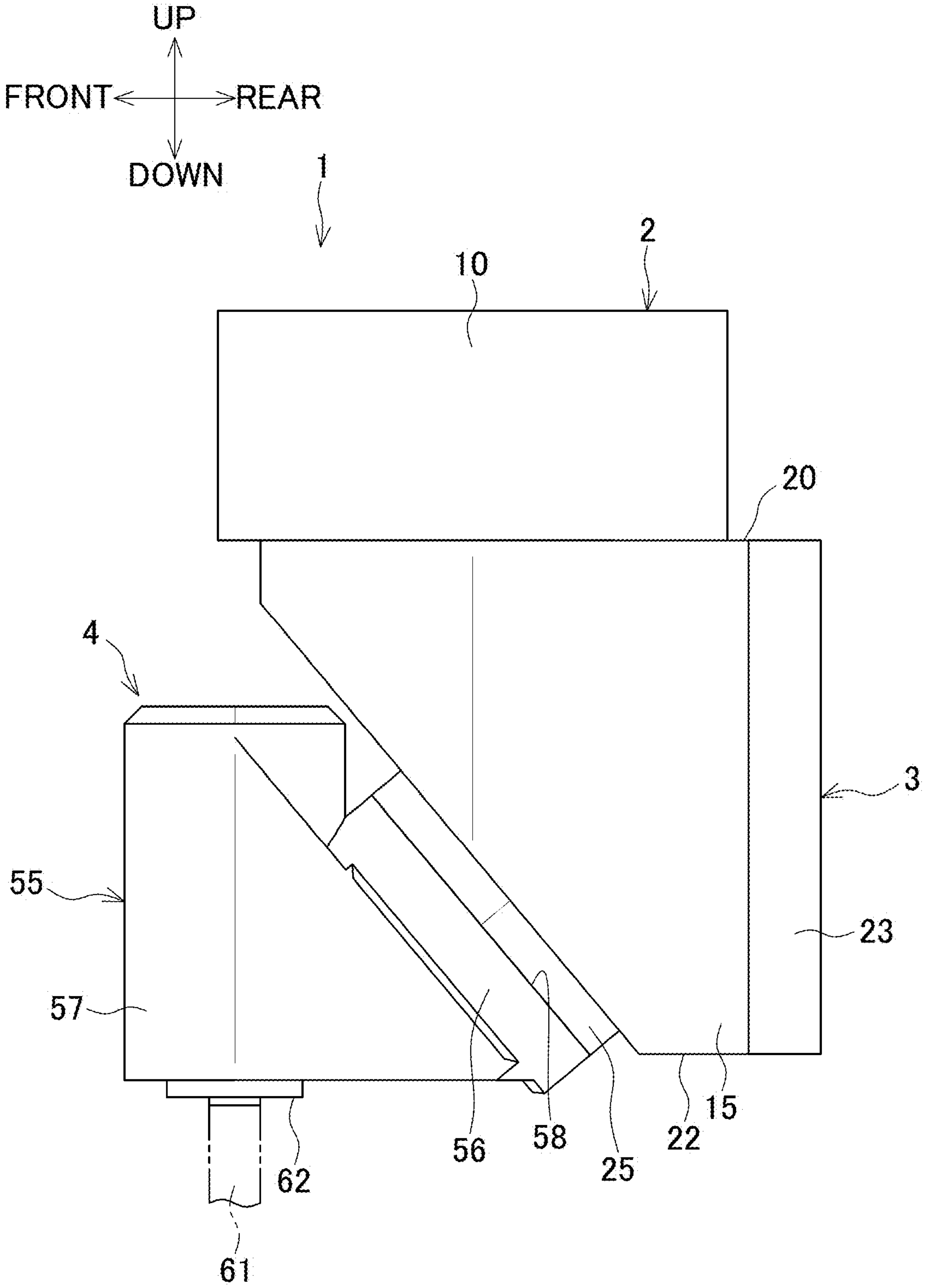
FIG. 1 is a side view of a spindle turning device.
Figure 2:
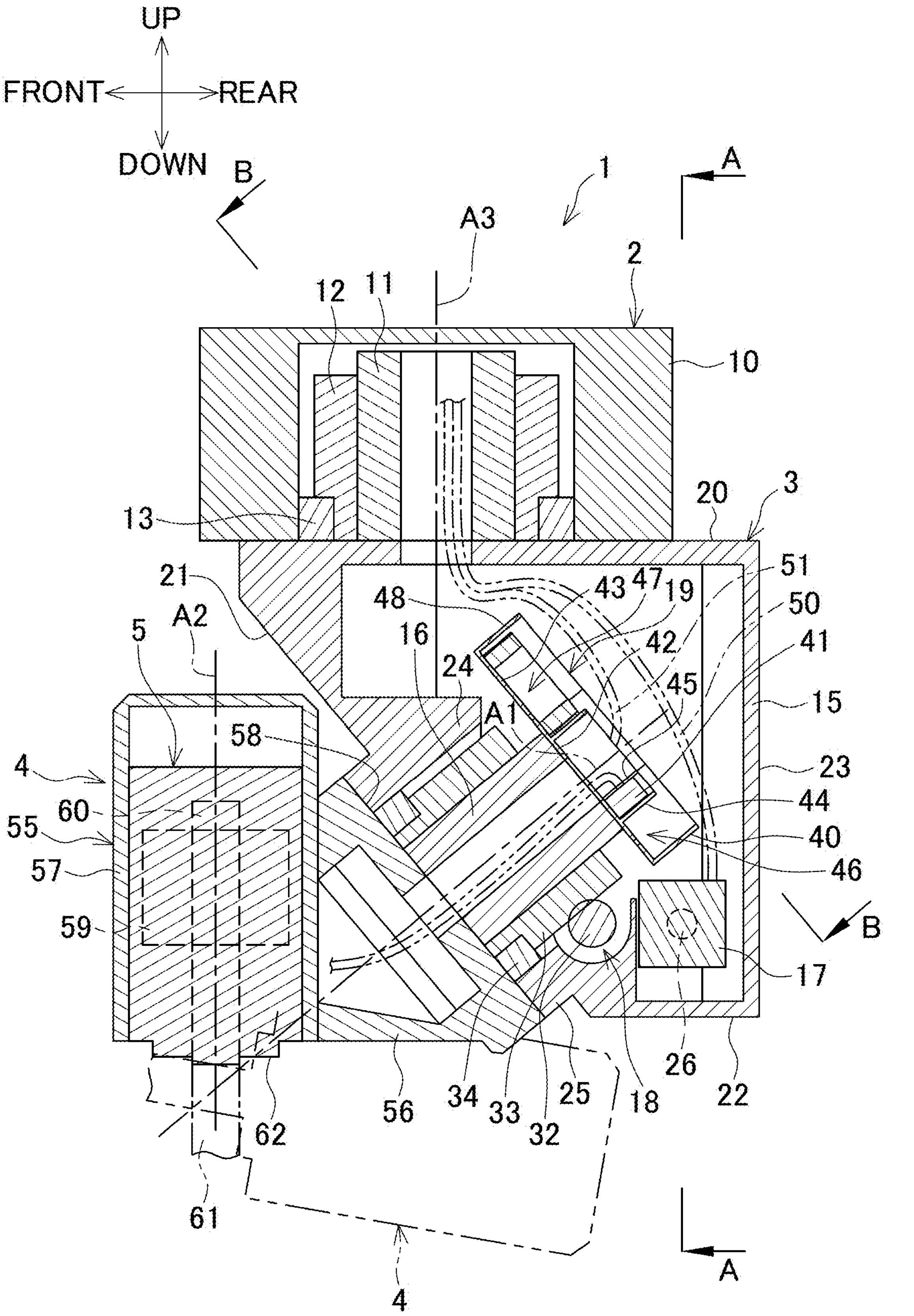
FIG. 2 is a center vertical cross-sectional view of the spindle turning device.

FIG. 1 is a side view illustrating an example of a spindle turning device 1 (hereinafter simply referred to as a "turning device 1") of the disclosure, and FIG. 2 is a center vertical cross-sectional view of FIG. 1. For the convenience of description, the upper and lower sides of FIG. 2 are regarded as the upper and lower parts, respectively, and the left and right sides of FIG. 2 are regarded as the front and rear, respectively, for description.

The turning device 1 includes a coupling unit 2, a main body unit 3, and a turning unit 4, in order from the upper side. A main spindle 5 is disposed in the turning unit 4.

The coupling unit 2 is attached as an attachment to a saddle of a double column machining center (not illustrated). The coupling unit 2 is one example of a coupling portion of the disclosure.

The coupling unit 2 has a coupling housing 10. The coupling housing 10 has a tubular shape attached to the saddle and houses a hollow shaft 11, a driven gear 12, and a drive gear and a motor (not illustrated) to rotate the driven gear 12. The hollow shaft 11 is disposed facing upward in a vertical direction from an upper surface 20 of a main body housing 15 described later. The hollow shaft 11 is one example of a second pivot shaft of the disclosure. The driven gear 12 is disposed integrally outside the hollow shaft 11. The driven gear 12 is rotatably supported in the coupling housing 10 via a bearing 13 and engages with the drive gear (not illustrated) disposed in the coupling housing 10.

The main body unit 3 has the main body housing 15. In the main body housing 15, a pivot shaft 16, a motor 17, a reducer 18, and a cable guide portion 19 are housed. The main body unit 3 is one example of a main body portion of the disclosure.

The main body housing 15 has the hollow shaft 11 integrated on the horizontal upper surface 20 and has a front surface 21, which is an inclined surface that retreats as it heads downward. A lower surface 22 is a horizontal plane that connects to a lower end of the front surface 21. The lower surface 22 is one example of a lowermost surface of the main body portion of the disclosure. A rear surface 23 is a vertical plane that has an arc shape in plan view and bulges rearward. The rear surface 23 is one example of outer surface of the main body portion on an opposite side from a support side of a turning portion of the disclosure.

Inside the front surface 21 of the main body housing 15, a tubular portion 24 that houses the pivot shaft 16 is formed. The tubular portion 24 is formed coaxially with a pivot shaft line A1 perpendicular to the front surface 21. The pivot shaft line A1 is one example of an axis line of a pivot shaft of the disclosure. A front end portion of the tubular portion 24 is a ring-shaped protrusion portion 25 that protrudes from the front surface 21.

The pivot shaft 16 has a hollow shape perpendicular to the front surface 21 with the pivot shaft line A1 at the center. The pivot shaft 16 is disposed facing upward to the rear from a coupling surface 58 of a turning housing 55 described later in the pivot shaft line A1 direction.

Figure 3:
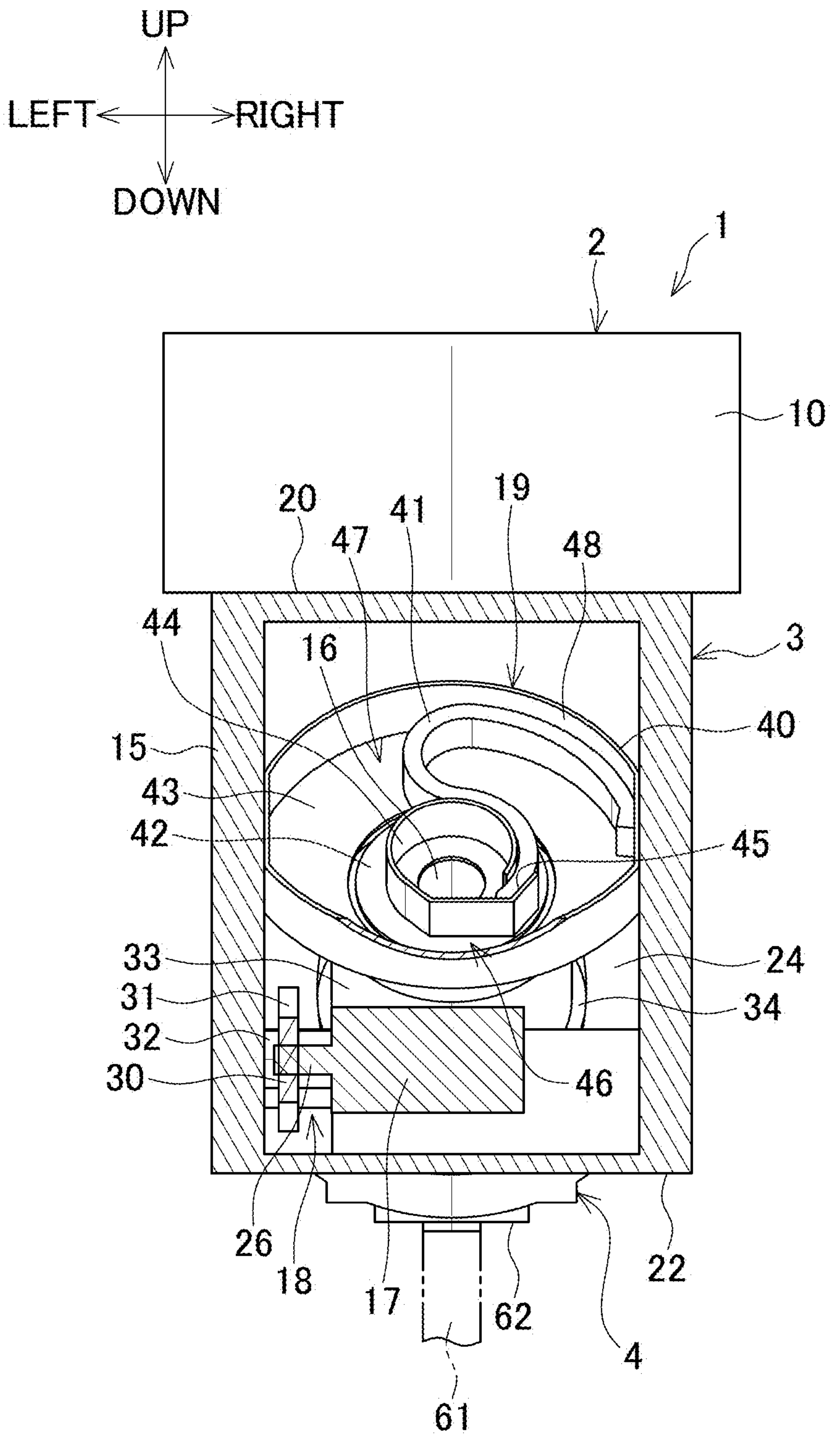
FIG. 3 is a cross-sectional view taken along the line A-A in FIG. 2.

As also illustrated in FIG. 3, the motor 17 is housed on an upper side of the lower surface 22 in a left-right direction in a posture where a motor shaft 26 points to the left.

The reducer 18 includes a first gear 30, a second gear 31, an input shaft 32, and an output shaft 33.

The first gear 30 is fixed to a left end portion of the motor shaft 26. The second gear 31 is fixed to a left end portion of the input shaft 32 and engages with the first gear 30. The input shaft 32 is arranged on a front side of the motor 17 in the left-right direction parallel to the motor shaft 26 and is rotatably supported in the main body housing 15. The output shaft 33 has a tubular shape disposed integrally outside the pivot shaft 16 and is rotatably supported in the tubular portion 24 via a bearing 34. Accordingly, the input shaft 32 is perpendicular to the pivot shaft line A1, which is also an axis line of the output shaft 33. For the input shaft 32, for example, a worm gear is used, and for the output shaft 33, for example, a worm wheel is used.

Figure 4:
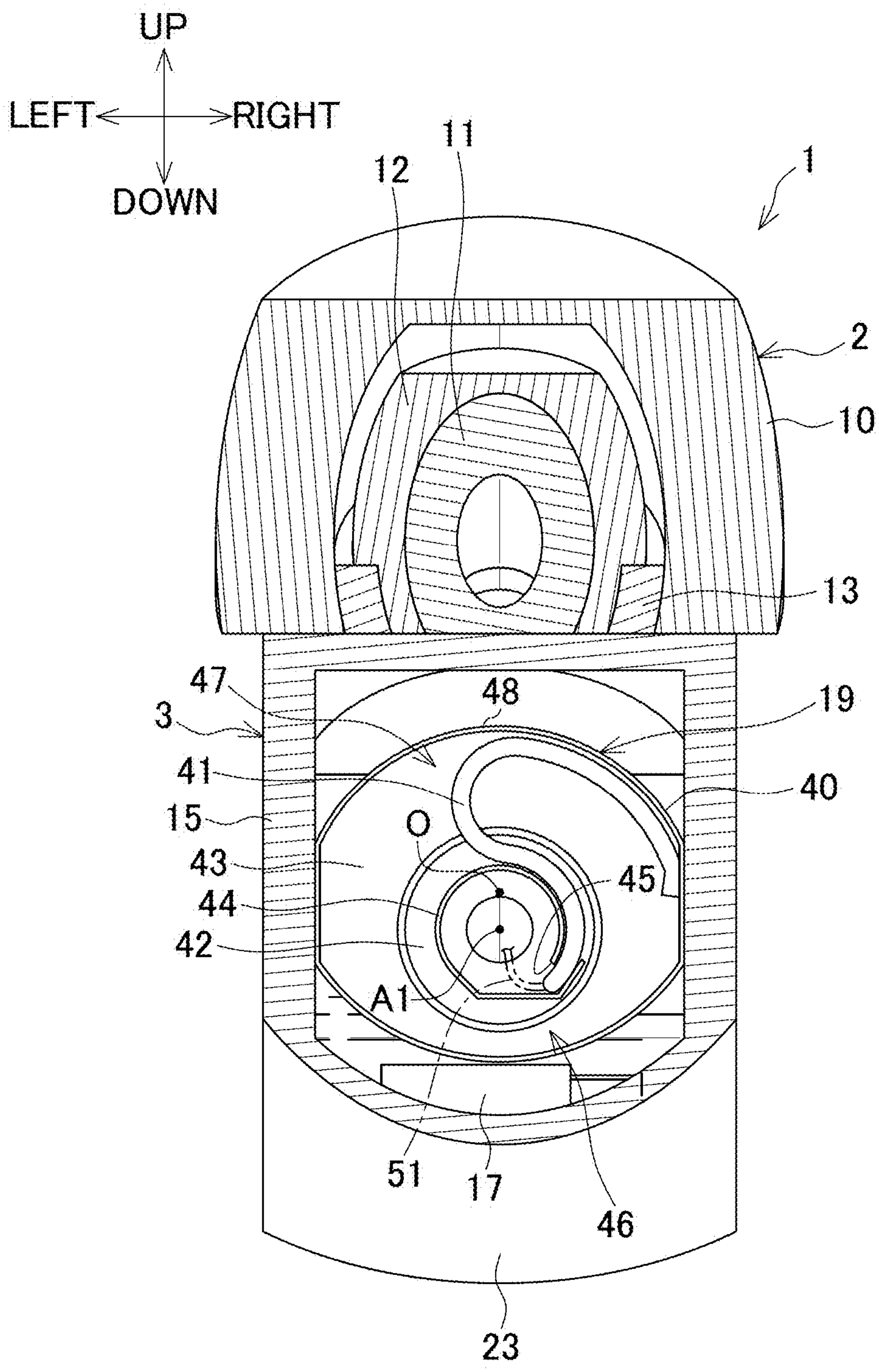
FIG. 4 is a cross-sectional view taken along the line B-B in FIG. 2.

The cable guide portion 19 is arranged on a plane perpendicular to the pivot shaft line A1 and has a guide housing portion 40 and a cable guide 41. The guide housing portion 40 has a dish shape that opens facing upward to the rear and is divided into a center portion 42 and an outer peripheral portion 43. The center portion 42 is a circular plate coaxially fixed to an end portion of the pivot shaft 16 and has an upper surface on which a circular inner frame 44 is disposed upright. An opening portion 45 that opens in a circumferential direction is disposed in a part of the inner frame 44. While the outer peripheral portion 43 is located on the same plane as the center portion 42, it does not have a circular shape concentric with the center portion 42 but has an up-down asymmetrical shape in which an upper side area 47 significantly projects upward more than a lower side area 46 across the pivot shaft line A1. That is, as illustrated in FIG. 4, the cable guide portion 19 is arranged such that a center O in the up-down direction of the cable guide portion 19 is shifted to the upper side with respect to the pivot shaft line A1 when viewed in the pivot shaft line A1 direction.

An outer frame 48 that is the same in height as the inner frame 44 is disposed upright on an outer peripheral edge of the outer peripheral portion 43. Left and right sides of the outer frame 48 form a width across flats and are fixed to left and right inner surfaces of the main body housing 15.

The cable guide 41 is disposed on the guide housing portion 40. The cable guide 41 has an inner end portion fixed to the opening portion 45 of the inner frame 44. The cable guide 41 has an outer end portion fixed to an inner surface of a chamfered part on the right side of the outer frame 48. In a turning position of the turning unit 4 where the main spindle 5 faces downward, as illustrated in FIG. 3 and FIG. 4, the opening portion 45 is located on the right side, and the cable guide 41 between the outer end portion and the inner end portion is bent in an S-shape in back view.

A cable 50 connected to the motor 17 is drawn through the hollow shaft 11 of the coupling housing 10 into the main body housing 15, then directly to pass through the main body housing 15, and is connected to the motor 17. On the other hand, a cable 51 connected to a main spindle motor 59 in the turning housing 55 is drawn through the hollow shaft 11 of the coupling housing 10 into the main body housing 15, then passes through the cable guide 41 from the outer end portion of the cable guide 41, and is drawn out of the inner end portion. The cable 51 is then drawn from the center of the guide housing portion 40 through the pivot shaft 16 into the turning housing 55 and connected to the main spindle motor 59. The cable 51 is one example of wiring of the disclosure.

The turning unit 4 has the turning housing 55 and the main spindle 5. The turning unit 4 is one example of a turning portion of the disclosure.

The turning housing 55 includes a coupling portion 56 and a main spindle holding portion 57. The coupling portion 56 has the coupling surface 58 having the same diameter as the protrusion portion 25 of the main body housing 15, and the coupling surface 58 coaxially abuts on the protrusion portion 25. The pivot shaft 16 is fixed to the coupling surface 58 and protrudes into the tubular portion 24. The main spindle holding portion 57 is formed on the front side of the coupling portion 56 and holds the main spindle 5 facing vertically downward. The main spindle 5 includes the main spindle motor 59 and a rotation shaft 60 that rotates by the driving of the main spindle motor 59. A tool 61 is mountable to a lower end of the rotation shaft 60.

In the turning device 1 configured as described above, when the motor 17 is driven, the rotation of the motor shaft 26 is decelerated by the first gear 30 and the second gear 31 and transmitted to the input shaft 32 to rotate the input shaft 32. When the input shaft 32 rotates, the output shaft 33 and the pivot shaft 16 rotate, and the turning unit 4 turns around the pivot shaft line A1 along with the pivot shaft 16. Accordingly, the main spindle 5 rotates from a downward-facing posture where a main spindle axis line A2 is in the vertical direction, and at the rotation of 180°, it moves to a line-symmetric position with the pivot shaft line A1 at the center, as illustrated by the two-dot chain line in FIG. 2. In addition, when the rotation is transmitted to the driven gear 12 in the coupling unit 2, the main body unit 3 and the turning unit 4 turn around an axis line A3 of the hollow shaft 11 through the hollow shaft 11.

Here, the motor 17 is located on the rear lower side of the pivot shaft line A1. Therefore, when the main spindle 5 is put into a downward-facing posture in the vertical direction, the lower surface 22 of the main body housing 15 is located above a lower end surface 62 of the main spindle 5. The lower end surface 62 is one example of lowermost surface of the turning portion of the disclosure.

Figure 5B:
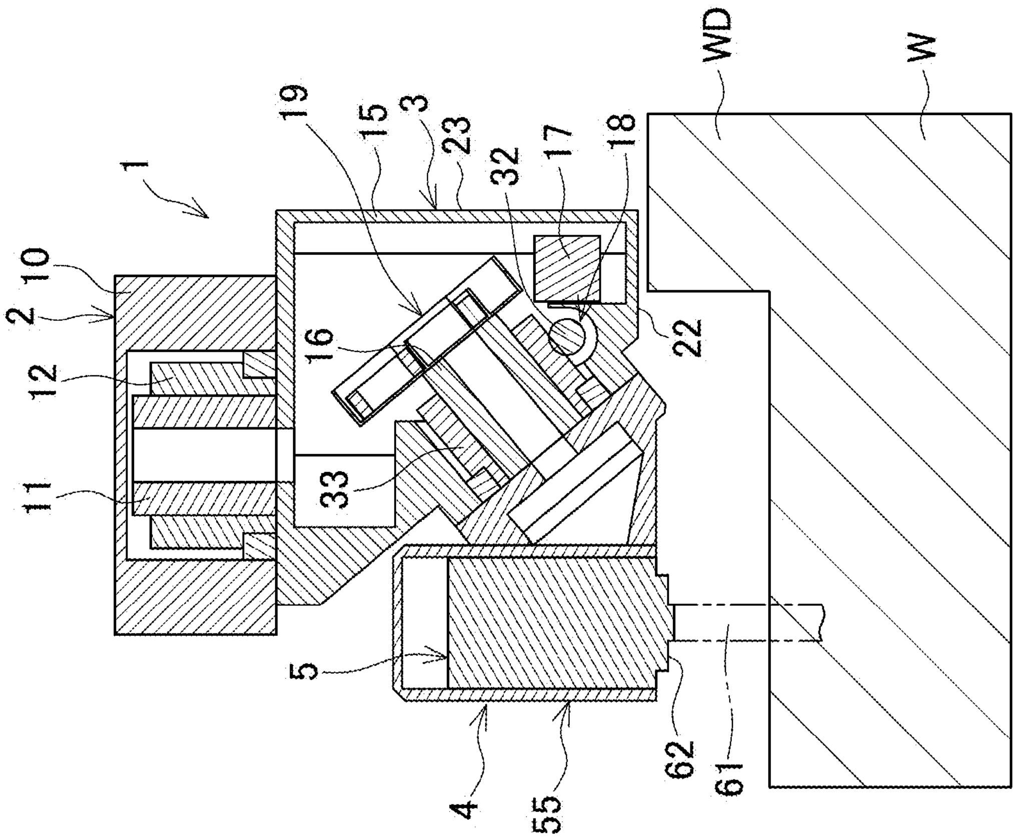
FIGS. 5A and 5B are explanatory views illustrating a machining state of a workpiece.
Figure 5A:
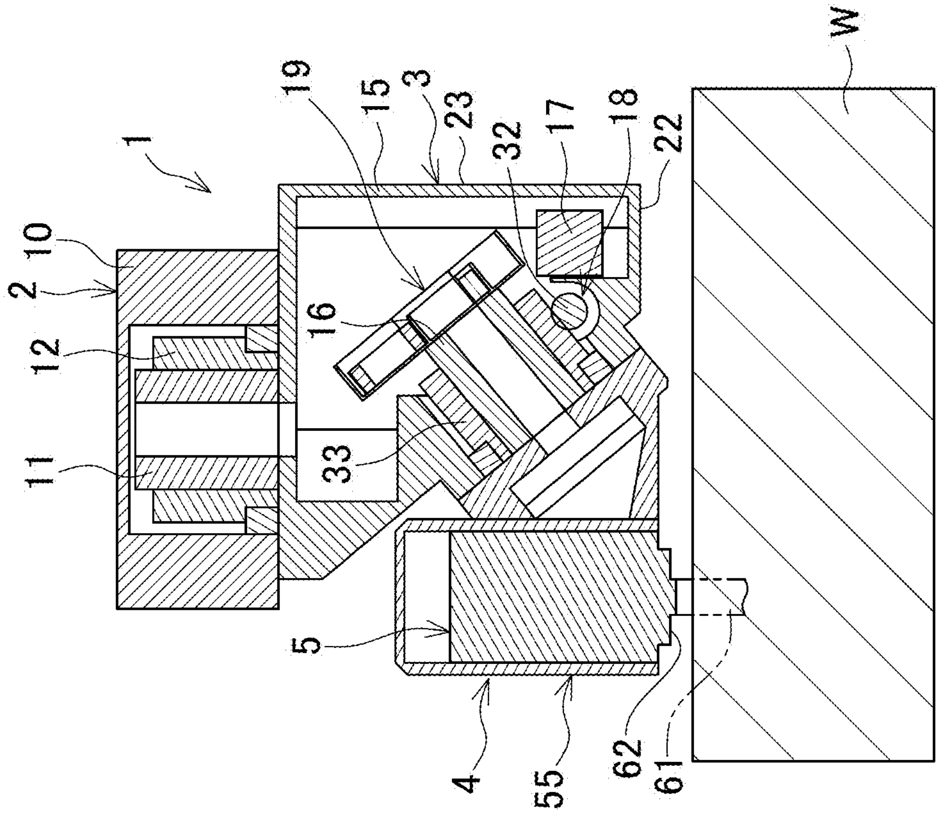

Accordingly, as illustrated in FIG. 5A, even when the main spindle 5 approaches a workpiece W during machining, interference of the lower surface 22 of the main body housing 15 with the workpiece W can be avoided. In addition, as illustrated in FIG. 5B, when an upward-facing tier portion WD is formed at an end portion of the workpiece W, the main spindle 5 can be brought closer to the workpiece W until the lower surface 22 of the main body housing 15 approaches the tier portion WD. Therefore, a protrusion length of the tool 61 can be shortened. By shortening the protrusion length of the tool 61, chatter vibration is suppressed, therefore enabling machining under a cutting condition with high machining efficiency. Accordingly, cutting time can be shortened.

Thus, the turning device 1 of the above form includes the turning unit 4 and the main body unit 3. The turning unit 4 includes the rotatable main spindle 5. The main body unit 3 supports the turning unit 4 turnably around the pivot shaft 16 inclined with respect to the main spindle axis line A2. The main body unit 3 includes the motor 17 that turnably drive the turning unit 4 and the reducer 18.

In the turning position of the turning unit 4 where the main spindle axis line A2 is in the vertical direction, the lower surface 22 of the main body unit 3 is located above the lower end surface 62 of the main spindle 5, and the motor 17 is arranged in the main body unit 3 on the lower side with respect to the pivot shaft line A1.

According to above mentioned configuration of the turning device 1, a reduction in a machining area and a restriction of an operating range can be avoided as much as possible by compactly arranging a constituting component in the main body unit 3.

The reducer 18 includes the input shaft 32 to which the rotation of the motor 17 is transmitted and the output shaft 33 that is coaxially arranged with the pivot shaft line A1 and transmits the rotation of the input shaft 32 to the pivot shaft 16. In addition, the input shaft 32 is perpendicular to the output shaft 33, and the motor 17 is arranged in the main body unit 3 in a posture where the motor shaft 26 is parallel to the input shaft 32.

Accordingly, in the turning device 1, the motor 17 and the reducer 18 can be arranged compactly in the main body unit 3 even when the motor 17 and the reducer 18 are asymmetrical.

Further, in the turning device 1, since the rear surface 23 of the main body unit 3 is formed in the vertical direction, the main body unit 3 can also become compact in a front-rear direction, contributing to avoiding the reduction in the machining area and the restriction of the operating range.

In the main body unit 3, the cable guide portion 19 that guides the cable 51 disposed in the turning unit 4 is arranged on an extension of the pivot shaft line A1 and on a plane perpendicular to the pivot shaft line A1. The cable guide portion 19 includes the cable guide 41 into which the cable 51 having flexibility is inserted and the guide housing portion 40 that houses the cable guide 41. The guide housing portion 40 is arranged at a position where the center O in the up-down direction of the guide housing portion 40 is shifted upward from the pivot shaft line A1 when viewed in the pivot shaft line A1 direction.

Accordingly, in the turning device 1, the guide housing portion 40 can be arranged at an upper position to secure the housing space for the motor 17, raising the position of the motor 17.

The coupling unit 2 that couples the main body unit 3 rotatably around the hollow shaft 11 in the vertical direction is further included on the upper side of the main body unit 3.

Accordingly, in the turning device 1, in addition to the turning unit 4 being rotatable around the pivot shaft line A1, the main body unit 3 and the turning unit 4 becoming rotatable around the axis line A3 allows the configuration to change the posture of the main spindle 5 to, for example, horizontal, vertical, diagonally upward. In view of this, the machining area can be expanded in the turning device 1.

The following describes modification examples of the disclosure.

The input shaft and the output shaft of the reducer are not limited to a worm gear. For example, a three-dimensional cam, such as a roller gear cam, may be used for the reducer. A reducer in which the input shaft is not perpendicular to the output shaft may be used.

The rear surface of the main body housing is not limited to being arc-shaped in plan view but may be a plane defined in the up-down and left-right directions. The outer surface in the main body portion on the opposite side from the support side of the turning portion need not be formed in the vertical direction as long as it does not hinder downsizing.

In the guide housing portion of the cable guide portion, as long as the housing space for the motor can be secured, the upper side area and the lower side area may have the same size in the up-down direction without shifting the center in the up-down direction upward with respect to the axis line of the pivot shaft. The shapes of the cable guide and the guide housing portion are not limited to the above forms, and the sizes and shapes can be changed appropriately. When air or coolant is supplied from the main spindle, in addition to wiring, piping may be inserted into the cable guide. The cable guide portion need not be included.

In the coupling portion, the form of the second pivot shaft can be changed appropriately. The second pivot shaft need not be a hollow shaft. The second pivot shaft need not be included.

The turning device may be a unit, other than a double column machining center, which can be attached to a machine tool. The turning device is not limited to a unit that can be attached as an attachment.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A spindle turning device comprising:

a turning portion including a rotatable main spindle; and a main body portion supporting the turning portion turnably around a pivot shaft inclined with respect to an axis line of the main spindle, the main body portion including a motor that turnably drives the turning portion and a reducer, wherein in a turning position of the turning portion where the axis line of the main spindle faces downward in a vertical direction, a lowermost surface of the main body portion is located above a lowermost surface of the turning portion, in the main body portion, a cable guide portion that guides wiring or piping disposed in the turning portion is arranged on an extension of the axis line of the pivot shaft and on a plane perpendicular to the axis line of the pivot shaft, the cable guide portion includes a cable guide into which the wiring or piping having flexibility are inserted and a guide housing portion that houses the cable guide, and the cable guide portion is arranged at a position where a center in an up-down direction of the guide housing portion is shifted upward with respect to the axis line of the pivot shaft when viewed in an axis line direction of the pivot shaft, the cable guide includes an inner end portion and an outer end portion, the guide housing portion includes a center portion and an outer peripheral portion, and the motor is arranged in the main body portion at a position where at least a part of the motor is located below the axis line of the pivot shaft and the cable guide portion in the vertical direction and overlaps the cable guide in the up-down direction, wherein the center portion is fixed to an end portion of the pivot shaft, and the outer peripheral portion is fixed in the main body portion and projecting upward more than downward when viewed in the direction of the axis line of the pivot shaft, the inner end portion is fixed to the center portion, the outer end portion is fixed to the outer peripheral portion, and the cable guide fixed to the outer peripheral portion is configured to be disposed upward with respect to the axis line of the pivot shaft when viewed in the direction of the axis line of the pivot shaft, even when the turning portion turns.

2. The spindle turning device according to claim 1, wherein the reducer includes an input shaft to which a rotation of the motor is transmitted and an output shaft that is coaxially arranged with the axis line of the pivot shaft and transmits a rotation of the input shaft to the pivot shaft, the input shaft is perpendicular to the output shaft, and the motor is arranged in the main body portion in a posture where a motor shaft is parallel to the input shaft.

3. The spindle turning device according to claim 2, wherein an outer surface of the main body portion on an opposite side from a support side of the turning portion is formed in the vertical direction.

4. The spindle turning device according to claim 1, further comprising a coupling portion that couples the main body portion rotatably around a second pivot shaft in the vertical direction on an upper side of the main body portion.

* * * * *